(12) United States Patent
Griffith et al.

(10) Patent No.: US 10,601,506 B2
(45) Date of Patent: Mar. 24, 2020

(54) OPTICAL COMMUNICATION DEVICE

(71) Applicant: BAE SYSTEMS plc, London (GB)

(72) Inventors: Michael Stewart Griffith, Chelmsford Essex (GB); Andrew James Williams, Chelmsford Essex (GB)

(73) Assignee: BAE SYSTEMS, PLC, London (GB)

( * ) Notice: Subject to any disclaimer, the term of this patent is extended or adjusted under 35 U.S.C. 154(b) by 0 days.

(21) Appl. No.: 16/309,332

(22) PCT Filed: Jun. 13, 2017

(86) PCT No.: PCT/GB2017/051711
§ 371 (c)(1),
(2) Date: Dec. 12, 2018

(87) PCT Pub. No.: WO2017/216537
PCT Pub. Date: Dec. 21, 2017

(65) Prior Publication Data
US 2019/0253142 A1 Aug. 15, 2019

(30) Foreign Application Priority Data

Jun. 13, 2016 (GB) .................................. 1610372.3
Jun. 13, 2016 (GB) .................................. 1610376.4
Jun. 16, 2016 (EP) .................................. 16174856

(51) Int. Cl.
*H04B 10/112* (2013.01)
*H04B 13/02* (2006.01)
(Continued)

(52) U.S. Cl.
CPC ....... *H04B 10/1123* (2013.01); *G02B 26/127* (2013.01); *H04B 10/112* (2013.01); *H04B 10/80* (2013.01); *H04B 13/02* (2013.01)

(58) Field of Classification Search
None
See application file for complete search history.

(56) References Cited

U.S. PATENT DOCUMENTS

| 4,017,146 A | 4/1977 | Lichtman |
| 6,381,055 B1 | 4/2002 | Javitt et al. |

(Continued)

FOREIGN PATENT DOCUMENTS

| CN | 101001110 A | * | 7/2007 |
| CN | 101001110 A | | 7/2007 |
| EP | 1158704 A1 | | 11/2001 |
| EP | 2456099 A1 | | 5/2012 |
| JP | 2004235899 A | | 8/2004 |
| WO | 2014184616 A1 | | 11/2014 |
| WO | 20171216537 A1 | | 12/2017 |

OTHER PUBLICATIONS

International Search Report and Written Opinion received for PCT Application No. PCT/GB2017/051711. dated Aug. 24, 2017. 16 pages.

(Continued)

*Primary Examiner* — David W Lambert
(74) *Attorney, Agent, or Firm* — Finch & Maloney PLLC

(57) ABSTRACT

Apparatus for and method of transmitting an optical signal by a Free Space Optical, FSO, communication system, the method comprising: transmitting, by an optical signal transmitter (104), an optical signal (700) into at least part of a volume of an optical medium (302); and controlling, by a controller, the optical signal transmitter (104), to scan the at least part of the volume (302) using the optical signal (700) in a sequence of non-overlapping loops (704, 708). The sequence of non-overlapping loops (704, 708) may be a sequence of non-overlapping, concentric circular loops.

20 Claims, 6 Drawing Sheets

(51) Int. Cl.
  *G02B 26/12* (2006.01)
  *H04B 10/80* (2013.01)

(56) References Cited

U.S. PATENT DOCUMENTS

| | | | |
|---|---|---|---|
| 6,469,815 B1 | 10/2002 | Poon et al. | |
| 2003/0043435 A1 | 3/2003 | Oettinger et al. | |
| 2003/0043436 A1* | 3/2003 | Nagai | H04B 10/1143 398/126 |
| 2004/0141753 A1* | 7/2004 | Andreu-von Euw | H04B 10/1127 398/122 |
| 2004/0208602 A1* | 10/2004 | Plante | H04B 10/1125 398/140 |
| 2007/0031151 A1 | 2/2007 | Cunningham et al. | |
| 2009/0252499 A1* | 10/2009 | Rotgaizer | H04B 10/1123 398/131 |
| 2012/0001734 A1 | 1/2012 | Gerber et al. | |
| 2012/0308239 A1 | 12/2012 | Sheth et al. | |
| 2013/0082162 A1 | 4/2013 | Eide | |
| 2015/0215040 A1 | 7/2015 | Dickson et al. | |

OTHER PUBLICATIONS

GB Search Report received for GB Application No. 1610372.3, dated Dec. 21, 2016. 6 pages.
Extended European Search Report received for EP Application No. 16174856.1, dated Dec. 5, 2016. 10 pages.
International Preliminary Report on Patentability received for PCT Application No. PCT/GB2017/051711. dated Dec. 27, 2018. 11 pages.
GB Search Report received for GB Application No. 1610376.4, dated Dec. 21, 2016. 6 pages.

* cited by examiner

OPTICAL COMMUNICATION DEVICE

FIELD OF THE INVENTION

The present invention relates to optical communication devices.

BACKGROUND

Free Space Optical (FSO) communications systems are well known for their ability to provide high data rate communications links. A FSO communication system typically consists of a pair of nodes or communication devices. Each node typically comprises an optical source, for example a laser or light emitting diode (LED), and an optical receiver. In use, the optical source of each node is aligned with the optical receiver of the other node. Modulation of optical signals emitted by the optical sources allows for the bidirectional transfer of data between the two nodes. Thus, there is a datalink between the nodes.

Most current FSO systems are mounted in fixed positions on the Earth and are manually aligned with each other. Commercial systems are available which can offer data rates of several Giga-bits per second (Gbps) over a range of several kilometres.

It is desirable to have communications systems that allow for underwater communications. Radio Frequency (RF) signals tends to be heavily attenuated by seawater, and hence the range of RF communications systems tends to be severely limited. Acoustic systems can offer low data rate transmission (kbps) over long ranges, but are typically overt which is undesirable for certain applications.

Optical communications systems have also been developed for underwater applications. Such underwater optical communications systems tend to provide relatively high data rate communications over short to medium ranges, for example up to a 300 m or so.

Like land-based FSO communication systems, an underwater optical communication system typically comprises a pair of nodes, each node will comprising an optical source and detector. However, unlike land-based FSO communication systems (where node positions are typically fixed), underwater modes tend to be mobile. Hence, in underwater applications, the position of each node, and hence the range and angular separation between the nodes, is not fixed. Thus, in underwater applications, alignment between opposing optical sources and detectors tends to be required in order for the communications system to function. In addition, many underwater nodes are unmanned nodes (e.g. unmanned vehicle), and hence manual alignment between a pair of nodes tends not to be possible. Furthermore, while each underwater node may have some estimate of the relative location of the opposing underwater node (e.g. a pre-programmed location and navigation using GPS/inertial systems, or through use of a separate data link) there may be a large range and angular uncertainty in its position.

Hence, a strategy is required for each node to accurately acquire the location of the opposing node before beam alignment (and hence optical communications) can occur. In addition, since the platforms may still be mobile, active beam alignment may be required during data transfer (tracking).

SUMMARY OF THE INVENTION

The present inventors have realised that it would be beneficial for optical communication nodes or devices to be able to reliably and accurately acquire the location of the opposing node, for example, before beam alignment and optical communications occur. The present inventors have further realised that it would be beneficial for nodes to be capable of active beam alignment (i.e. tracking) during data transfer, particularly for mobile nodes.

The present inventors have further realised that using an optical beam with large divergence, for example to illuminate the area surrounding the transmitting node to ensure that the other each node receives some optical power, tends to be very power inefficient since most of the transmitted optical power does not reach the detector of the opposing node. The present inventor have realised that such a strategy tends to only be suitable in clean water and/or at short range.

The present inventors have further realised that using a lens to focus the transmitted light to produce a focussed "spot" on the communications detector tends to be highly dependent on angle of incidence of the incoming light. Thus, large incidence angles may result in all or part of the spot being displaced from the centre of the communications detector, thereby reducing the communication link margin.

The present inventors have further realised that scanning a narrow/collimated light beam across an angular region of uncertainty may be inefficient. For example, each node in a pair of nodes may comprise an angle of arrival (AoA) light sensor. A first of the nodes may scan a narrow light beam across the angular search area. At some point during the scan, the light beam from the first node is incident on the AoA sensor of the second node, thereby allowing the second node to infer the angular location of the first node. The second node may then direct a narrow light beam towards the inferred location of the first node. The AoA sensor of the first node may then detect the beam from the second node, and, using measurements of the beam, infer the location of the second node. The first node may then stop scanning, and direct its narrow light beam in the inferred location of the second node. Communications between the nodes may then begin. However, the present inventors have realised that, for such a system and method, scanning a large angular search area with a narrow beam may take significant amount of time. Thus, acquiring the communication link tends to use increased time and/or power. The present inventors have further realised that the link margin may not be known (for example, since the water conditions and/or the range between nodes may not be known). Hence, if conditions happen to be favourable (for example, the distance between nodes is relatively short range, and/or the water through which communications are to occur is relatively clear), time may be wasted scanning the search area with a collimated beam of very high irradiance, when a scan with a larger beam (with lower irradiance) may provide the AoA sensors of the nodes with sufficient power to enable location of the other node.

The present inventors have realised it would be beneficial to provide a system and method that overcome the above mentioned deficiencies of using optical beams having large divergence and also the above mentioned deficiencies of using narrow/collimated optical beams.

In a first aspect, the present invention provides a method of transmitting an optical signal by a Free Space Optical, FSO, communication system. The method comprises: transmitting, by an optical signal transmitter, an optical signal into at least part of a volume of an optical medium; and controlling, by a controller, the optical signal transmitter, to scan the at least part of the volume using the optical signal in a sequence (i.e. a succession (one after another)) of a plurality of non-overlapping loops.

When scanning the volume, to scan a loop, the controller controls the transmitter such that at least part of the transmitter moves along a path that defines a loop, i.e. a path that crosses itself at least once. For example, when scanning the volume, the controller controls the transmitter to move along a path that has its start point the same point as its end point. Thus, during the scanning of the volume, a path over a plane onto which the optical signal is projected, defines a plurality non-overlapping loops on that plane, i.e. a plurality of non-overlapping paths, each having their start points be the same as their end points. Each of loops in the sequence may be a substantially circular loop.

The step of controlling may comprise controlling the optical signal transmitter to scan the at least part of the volume by repeating at least part of one or more of the loops at least twice. At least part of one or more of the loops may be repeated at least twice. At least part of one or more of the loops may be repeated at most twice. At least part of one or more of the loops may be repeated exactly twice.

Transmitting the optical signal may comprise: generating an optical signal; modifying a divergence and an irradiance of the generated optical signal such that at least one of the divergence and the irradiance is equal to a preselected value; and transmitting the modified optical signal.

The method may further comprise: transmitting, by the optical signal transmitter or a further optical signal transmitter, a further optical signal into at the least part of the volume, the further optical signal having a different beam divergence and irradiance than the optical signal; and controlling, by a controller, the optical signal transmitter or the further optical signal transmitter, to scan the at least part of the volume using the further optical signal in a further sequence of non-overlapping loops.

The method may further comprise: transmitting the optical signal transmitter or a further optical signal transmitter, a further optical signal into at least part of the volume, the further optical signal having a decreased beam divergence than the optical signal and an increased beam irradiance than the optical signal; and controlling, by a controller, the optical signal transmitter or the further optical signal transmitter, to scan the at least part of the volume using the further optical signal in a further sequence of non-overlapping loops.

The method may further comprise: responsive to transmitting the optical signal into the at least part of the volume, receiving, by an optical signal detector, a response optical signal; and determining, using measurements of the response optical signal by the optical signal detector, by one or more processors, a location of a source of the response optical signal.

A field of view of the optical signal transmitter may be directed in a same direction as a field of view of the optical signal detector.

The method may further comprise: the FSO communication system transmits a location signal wherein the location signal at least operates to enable the source of the response optical signal to identify the position of the FSO communication system.

The location signal may be transmitted in substantially the same direction as the field of view of the optical signal detector. This may be to enable the source of the response optical signal to use the location signal to manoeuvre to a position where effective communication may be performed, for example, the bit error rate of a communication signal is at an acceptable level for the current mission. Maneuvering may be required due to while the source of the response signal has identified the position of the FSO communication system, the communication signal levels may be too low to achieve the required communication data rate between the FSO communication system and the source of the response signal.

The location signal may act as a beacon and may undertake Identification Friend or Foe (IFF) so that the FSO communication system may avoid an unknown acquisition or a known undesirable acquisition.

The location signal is preferably an optical location signal. The location signal may be an acoustic signal, which may have a greater range than an optical signal.

The optical medium may be water.

In a further aspect, the present invention comprises a Free Space Optical, FSO, communication system comprising: an optical signal transmitter configured to transmit an optical signal into at least part of a volume of an optical medium; and a controller configured to control the optical signal transmitter to scan the at least part of the volume using the optical signal in a sequence of non-overlapping loops.

The sequence of non-overlapping loops may be a sequence of non-overlapping, concentric circular loops. The controller may be further configured to scan the at least part of the volume by repeating at least part of one or more of the loops at least twice.

The FSO communication system may further comprise an optical signal detector configured to, responsive to the optical signal transmitter transmitting the optical signal into the at least part of the volume, receive a response optical signal. The FSO communication system may further comprise one or more processors configured to determine, using measurements of the response optical signal by the optical signal detector, a location of a source of the response optical signal. A field of view of the optical signal transmitter may be directed in a same direction as a field of view of the optical signal detector.

In a further aspect, the present invention comprises a vehicle comprising an FSO communication system according to any preceding aspect. The vehicle may be a submersible vehicle.

DETAILED DESCRIPTION

Figure 1:
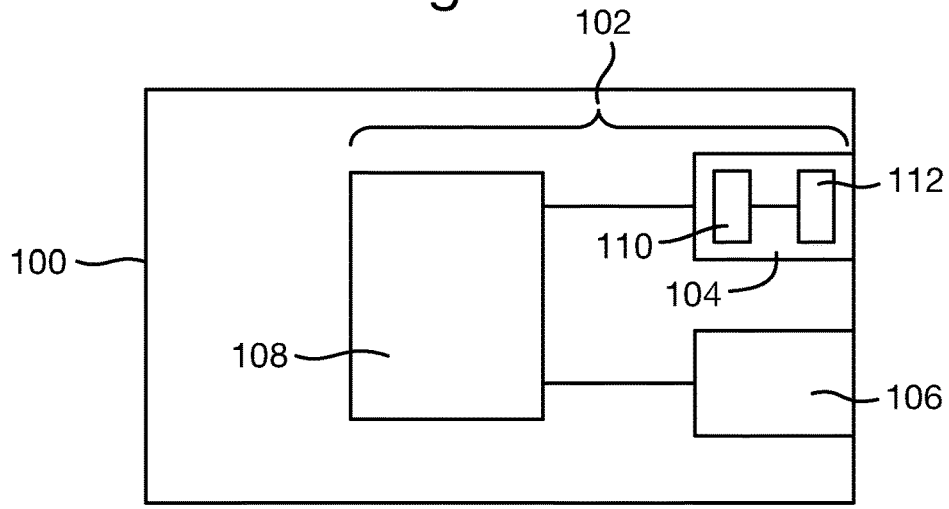
FIG. 1 is a schematic illustration (not to scale) showing a vehicle comprising an optical communications system.

FIG. 1 is a schematic illustration (not to scale) showing an example vehicle 100 in which an embodiment of an optical communications system 102 is implemented.

The vehicle 100 is an unmanned, submersible (or underwater) vehicle, i.e. a vehicle that is configured to operate while submerged, for example, in water.

In this embodiment, the optical communications system 102 comprises an optical signal transmitter 104, an optical signal detector 106, and a processor 108.

The optical signal transmitter 104 is configured to transmit an optical signal (such as a laser beam) from the vehicle 100, as described in more detail later below with reference to FIGS. 2 to 9. In this embodiment, the optical signal transmitter 104 comprises an optical signal generator 110 and lens 112.

The optical signal generator 110 is configured to generate an optical signal, and send the generated optical signal to the lens 112 for transmission from the vehicle 110. The optical signal generator 110 may comprise, for example, a laser or light emitting diode (LED). The optical signal generator 110 may be configured to modulate the generated optical signals to encode data.

In this embodiment, the lens 112 is arranged to focus the generated optical signal from optical signal generator 110, and direct the focussed optical signal away from the vehicle 100. The lens 112 is controllable to vary the divergence of the transmitted optical signal. For example, the lens 502 may be a translating lens, a zoom lens, a fluidic lens, a programmable liquid crystal lens, or a programmable holographic lens (such as a switchable Bragg Element or a Digilens). The lens 502 is controlled by the processor 108.

The optical signal transmitter 104 is operatively coupled to the processor 108 such that the processor 108 may control operation of the optical signal transmitter 104, i.e. of the optical signal generator 110 and the lens 112.

The optical signal detector 106 is configured to detect an optical signal (such as a laser beam) incident on the optical signal detector 106, and to generate an output corresponding to the received optical signal. In this embodiment, the optical signal detector 106 comprises an Angle of Arrival (AoA) sensor having a relatively narrow Field of View (FoV).

The optical signal detector 106 is operatively coupled to the processor 108 such that the processor 108 may receive an output of the optical signal detector 106. The processor 108 is configured to process the received output of the of the optical signal detector 106 as described in more detail later below with reference to FIG. 2.

In this embodiment, the optical signal transmitter 104 is steerable such that the direction, relative to the vehicle 100, in which an optical signal is transmitted by the optical signal transmitter 104 may be varied. Thus, an optical signal transmitted by the optical signal transmitter 104 may be scanned over an area. The steering of the optical signal transmitter 104 is controlled by the processor 108. Also, in this embodiment, the optical signal detector 106 is steerable such that the FoV of the optical signal detector 106 may be varied. The steering of the optical signal detector 106 is controlled by the processor 108.

The optical signal transmitter 104 and the optical signal detector 106 may be steered in any appropriate way. For example, in some embodiments the optical signal transmitter 104 and/or the optical signal detector 106 are mounted to a pan/tilt unit which is controlled by the processor 108. In some embodiments, one or more steering mirrors is used to steer the optical signal transmitter 104 and/or the optical signal detector 106. The one or more steering mirrors may be controlled by the processor 108.

In this embodiment, the optical signal transmitter 104 and the optical signal detector 106 are directed in substantially the same direction.

Apparatus, including the processor 108, for implementing the above arrangement, and performing the method steps to be described later below, may be provided by configuring or adapting any suitable apparatus, for example signal amplifiers, one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

Figure 2:
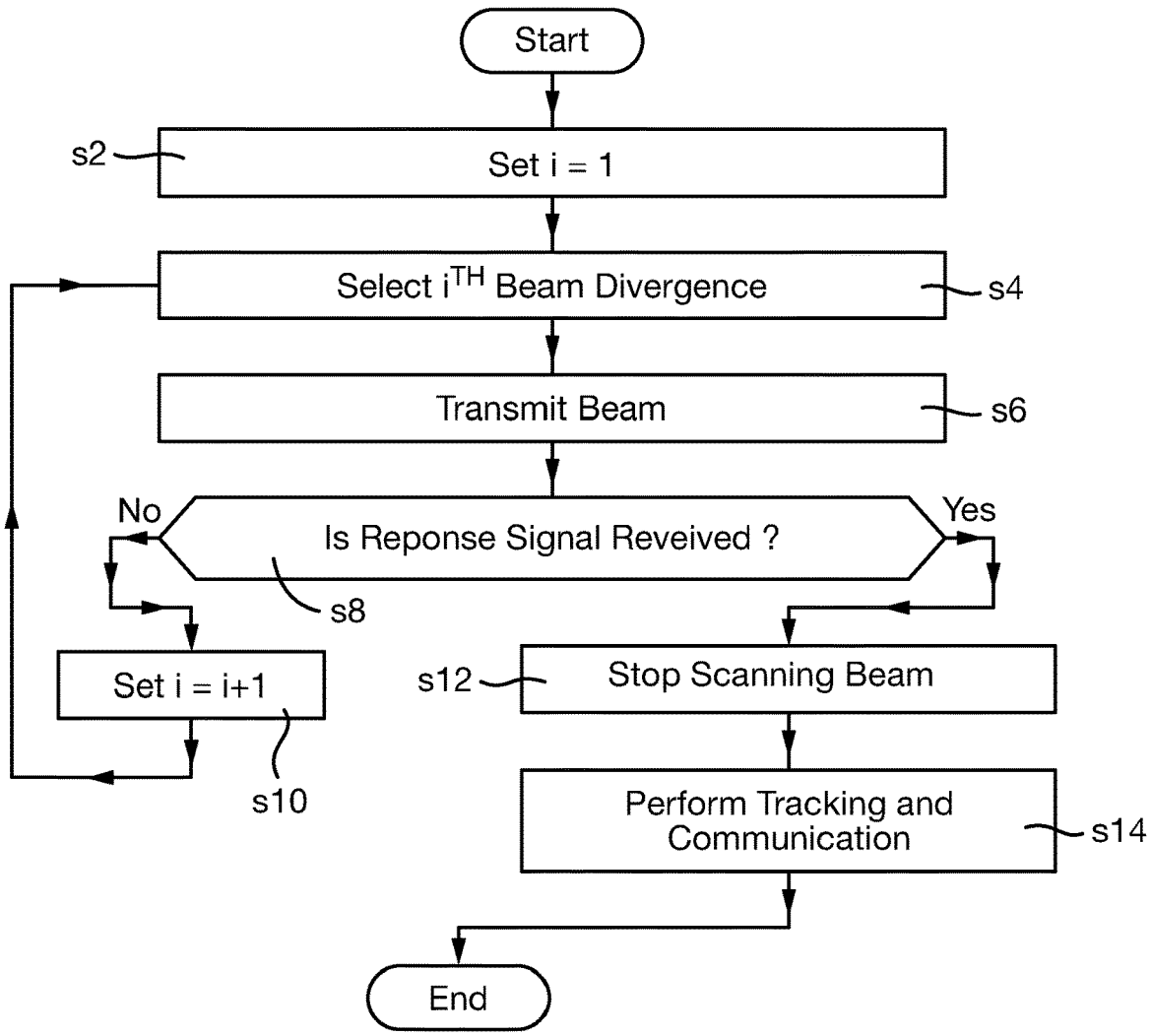
FIG. 2 is a process flow chart showing certain steps of an optical communications process.

FIG. 2 is a process flow chart showing certain steps of an embodiment of an optical communications process. In this embodiment, the optical communications process by which the submersible vehicle 100 communicates in an underwater environment with a further submersible vehicle.

At step s2, the processor 108 sets the value of an iteration index, i, to be equal to one, i.e. i=1.

In this embodiment, the optical communications process comprises iteratively performing steps s4 to s8. The iteration index i is indicative of an iteration number of the process.

At step s4, the processor 108 selects a value for the divergence of the ith light beam to be transmitted from the vehicle 100.

In this embodiment, in the first iteration of steps s4 to s8 (i.e. for i=1), the value for the divergence of the first light beam to be transmitted from the vehicle 100 is selected to be as large as possible, i.e. the largest possible beam divergence that is achievable by the lens 112.

At step s6, the processor 108 controls the optical signal transmitter 104 to transmit a light beam having the selected beam divergence.

Figure 3:
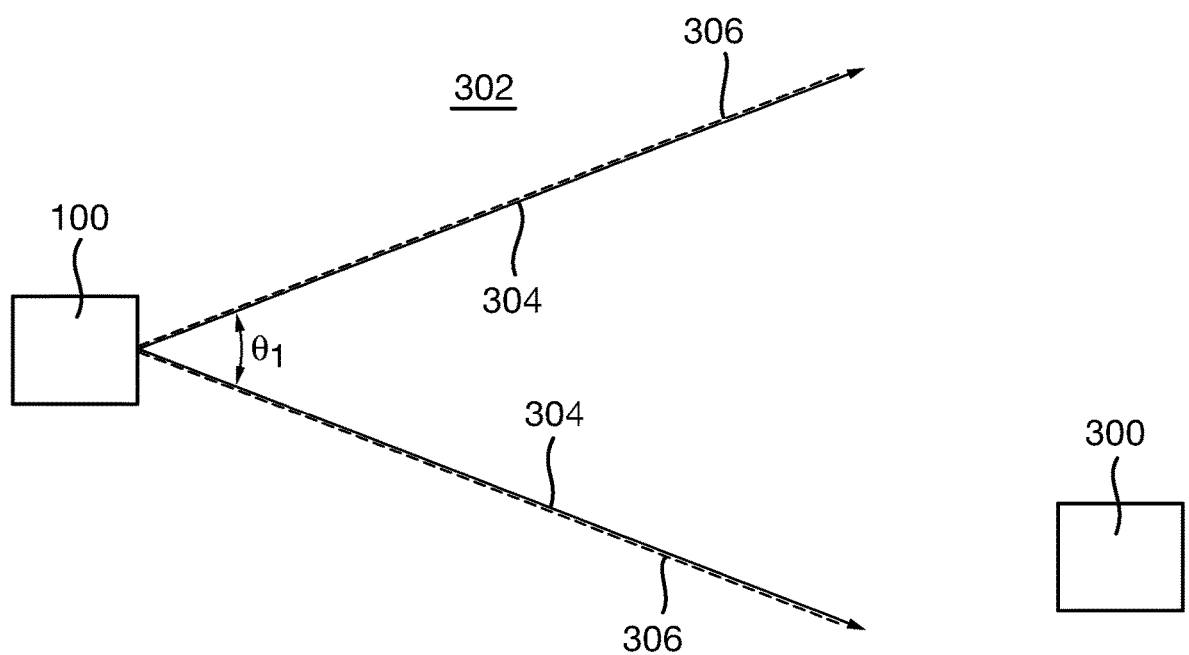
FIG. 3 is a schematic illustration (not to scale) showing transmission of a first light beam from the vehicle.

FIG. 3 is a schematic illustration (not to scale) showing transmission of the first light beam at the (i=1)th iteration of step s6.

In this embodiment, the vehicle 100 transmits the first light beam in a direction of the further vehicle 300, through an optical medium 302 which, in this embodiment, is water (for example, seawater).

The first light beam is indicated in FIG. 3 by two solid arrows and the reference numeral 304. The first light beam 304 is bounded by these arrows. In this embodiment, the first light beam 304 has a divergence of $\theta_1$, where $\theta_1$ is the maximum divergence achievable by the optical signal transmitter 104.

In this embodiment, the first light beam 304 substantially covers the entirety of a search area or search volume, which is indicated in FIG. 3 by dotted lines and the reference numeral 306. The search area 306 is an area in which the vehicle 300 is to transmit light beam to attempt to establish a communications link with the further vehicle 300. In this embodiment, since, in the first iteration i=1, the first light beam 304 covers all of the search area 306, the first light beam 304 is not scanned across the search area 306. In particular, in this embodiment, the search area 306 is defined by the value $\theta_1$.

In this embodiment, the further vehicle 300 comprises an optical communications system capable of detecting optical signals incident on the further vehicle 300, and further configured to transmit optical signals. For example, in some embodiments, the further vehicle may comprise the optical communications system 102 described in more detail earlier above with reference to FIG. 1.

In this embodiment, the communications conditions (for example the distance between the vehicle 100 and the further vehicle, and/or the turbidity of the water 302) are such that an optical detector on board the further vehicle 300 does not receive sufficient power from the first light beam 304 to enable it to detect the first light beam 304. In other words, the first light beam 304 is attenuated by the water 302 to such a degree that, in effect, the first light beam 304 is not received by the further vehicle 300.

Because, in the first iteration i=1, the further vehicle 300 does not detect the light beam transmitted by the vehicle, the further vehicle 300 does not transmit a response optical signal towards the vehicle 100.

However, in other embodiments, the communications conditions may be more favourable and such that the wide first beam 304 is received and detected by the optical detector of the further vehicle 300. In this case, the further vehicle will transmit a response signal back to the vehicle 100, which is received at the vehicle 100, as described in more detail later below with reference to FIG. 8.

At step s8, the processor 108 determines whether or not the optical signal detector 106 has detected an incident optical signal. In particular, in this embodiment, the processor 108 determines whether or not the optical signal detector 106 has detected a response optical signal from the further vehicle 100.

If at step s8, the processor 108 determines that the optical signal detector 106 has detected an incident optical signal, the method proceeds to step s12. Steps s12 to s14 will be described in more detail later below after a description of step s10 and subsequent iterations (i=2, 3, ... ) of steps s4 to s8.

However, if at step s8, the processor 108 determines that the optical signal detector 106 has not detected an incident optical signal, the method proceeds to step s10.

At step s10, the processor 108 increase the value of the iteration index, i, by one, i.e. i=i+1.

After step s10, the method proceeds back to step s4 for a next iteration of steps s4 to s8.

In this embodiment, in the subsequent iterations of step s4, the processor 108 selects successively decreasing values for the divergence of the light beam to be transmitted from the vehicle 100. In other words, in each iteration of step s4, the processor 108 selects a value for the divergence of the light beam that is lower than the value selected in the previous iteration.

In particular, in this embodiment, at each iteration of step s4, the processor 108 selects the value for the divergence of the light beam to be transmitted from the vehicle 100 using the following formula:

$$\theta_i = \frac{\theta_1}{2i-1} \text{ for } i = 1, 2, 3, \ldots$$

where:
i is the iteration index, i=1, 2, 3, ... ;
$\theta_i$ is the selected light beam divergence for the ith iteration;
$\theta_1$ is the maximum light beam divergence achievable by the lens 112.

Thus, for example, in a second iteration (i=2) of steps s4 to s8, the selected beam divergence is $\theta_1/3$; in a third iteration (i=3) of steps s4 to s8, the selected beam divergence is $\theta_1/5$; in the fourth iteration (i=4) of steps s4 to s8, the selected beam divergence is $\theta_1/7$; and so on.

In this embodiment, the divergence of the transmitted light beams in the subsequent iterations of step s6 (i.e. iterations i=2, 3, ... ) is less than that in the first iteration, i=1. Thus, in subsequent iterations of step s6, the transmitted light beam will not cover the entirety of the search area 306 at the same time. Thus, in this embodiment, in the subsequent iterations of step s6, the processor 108 controls the optical signal transmitter 104 to scan the transmitted light beam across all of the search area 306.

In particular, in this embodiment, at each iteration of step s6, the processor 108 controls the optical signal transmitter 104 to scan the transmitted light beam in a sequence of non-overlapping concentric circles, as described in more detail below with reference to FIGS. 4 to 7.

In this embodiment, the power used to generate the light beam is substantially the same for each iteration. Thus, decreasing the divergence of the light beam increases its irradiance. In other words, in each iteration of step s6, the irradiance of the light beam is higher than the irradiance in the previous iteration. Thus, at subsequent iteration, the light tends to penetrated through the water 302 to a greater extent, in effect increasing the acceptable attenuation of the signal through the water path.

In particular, in this embodiment, at each iteration of step s6, the irradiance of the transmitted light beam tends to be in accordance with the following formula:

$$I_i = (2i-1)^2 I_1 \text{ for } i=1,2,3, \ldots$$

where:
i is the iteration index, i=1, 2, 3, ... ;
$I_i$ is the irradiance of the ith light beam;
$I_1$ is the irradiance of the first light beam 304.

Figure 4:
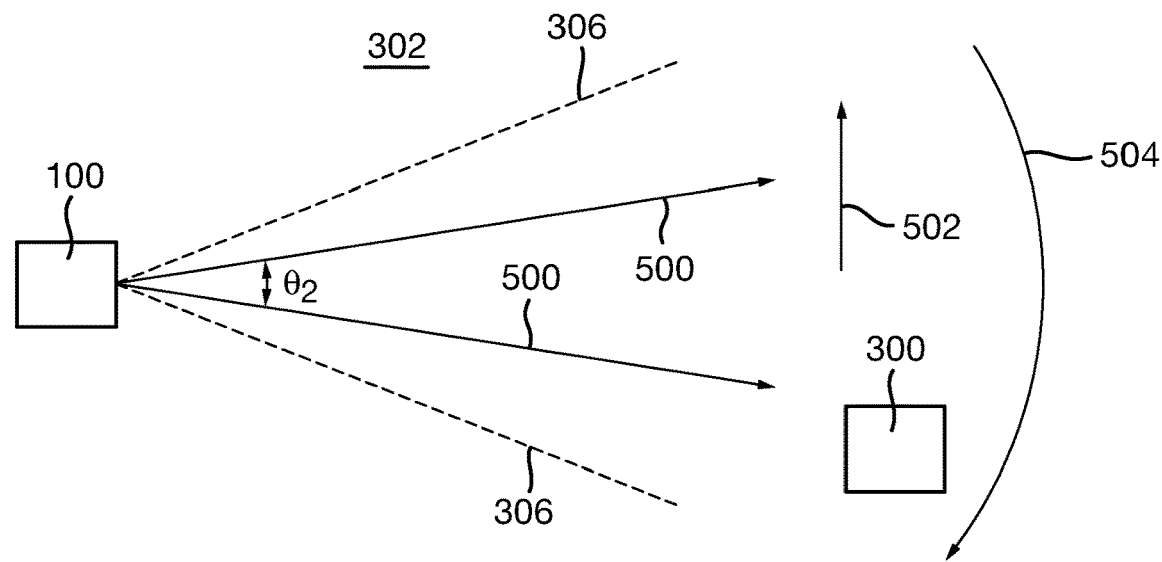
FIG. 4 is a schematic illustration (not to scale) showing transmission of a second light beam from the vehicle.

FIG. 4 is a schematic illustration (not to scale) showing transmission of the light beam at the (i=2) iteration of step s6.

In this embodiment, the vehicle 100 transmits the second light beam (bounded by solid arrows 500) in a direction of the further vehicle 300, through the optical medium 302. The second light beam 500 has a divergence of $\theta_2$, which, in this embodiment, is equal to $\theta_1/3$.

By decreasing the divergence of the beam (from $\theta_1$ to $\theta_2$), the effective range of the optical communication system 102 is increased.

In this embodiment, to cover the entirety of the search area 306, the second light beam 500 is scanned in a pattern indicated in FIG. 4 by arrows and the reference numerals 502 and 504, and described in more detail below with reference to FIG. 5.

Figure 5:
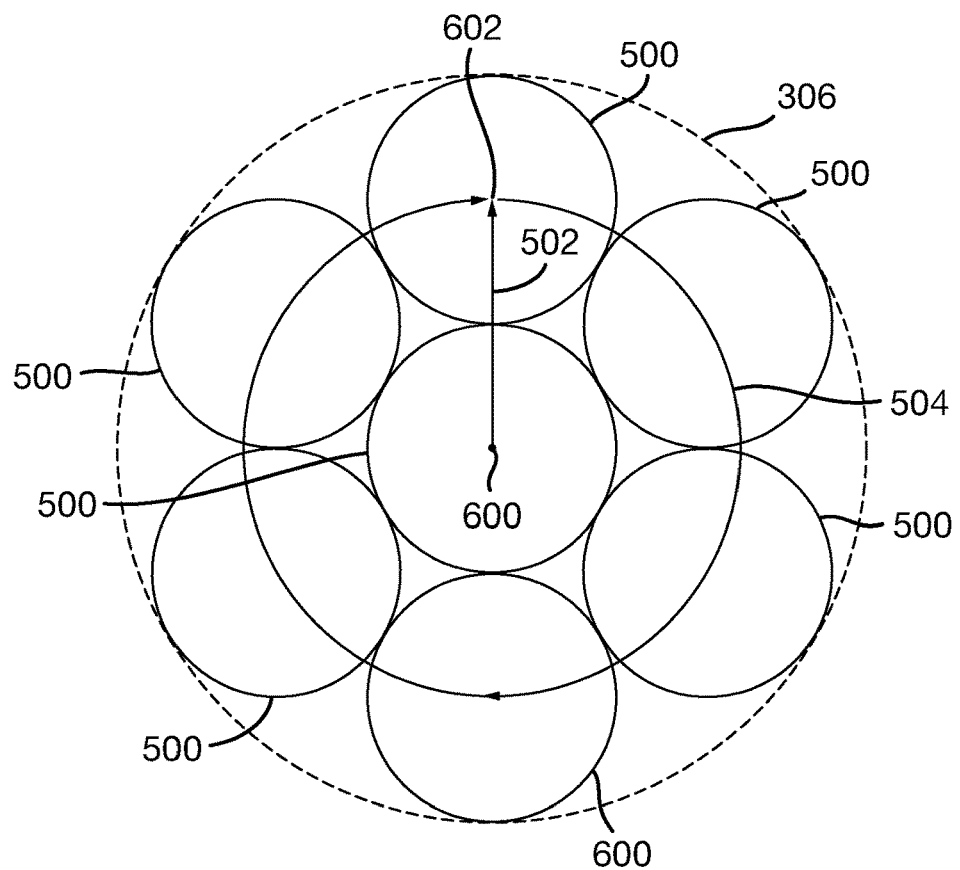
FIG. 5 is a schematic illustration (not to scale) showing a scan pattern used for the second light beam.

FIG. 5 is a schematic illustration (not to scale) showing a scan pattern implemented by the optical communications system 102 to scan the second light beam 500 over the search area 306.

FIG. 5 shows the search area 306 from the point of view of the vehicle 100. In this embodiment, from the point of view of the vehicle 100, the search area 306 is substantially circular.

In this embodiment, the search area 306 is scanned as follows.

Firstly the processor 108 controls the optical signal transmitter 104 to transmit a light beam at the centre 600 of the search area 306. In particular, the optical signal transmitter 104 is centred with respect to the search area 306.

Secondly, after scanning at the centre 600 of the search area 306, the processor 108 controls the optical signal transmitter 104 to move its FoV towards the edge of the search area 306 through an angular distance of $\theta_1/3$ (i.e. the divergence of the light beam 500 in this iteration). In particular, the optical signal transmitter 104 is centred at point 602 shown in FIG. 5. This movement is indicated in FIG. 5 by a straight arrow and the reference numeral 502.

Thirdly, the processor 108 controls the optical signal transmitter 104 to scan an outer portion of the search area 306 by moving its FoV in a circular loop about the centre 600. This movement is indicated in FIG. 5 by an arrow and the reference numeral 504. Thus, an annulus surrounding the scanned central portion is scanned.

Advantageously, the scanned circular loop 504 does not overlap with the originally scanned central portion. Thus, scanning of the search area 306 tends to be efficient in term of both time and power.

In this embodiment, the processor 108 controls the optical signal transmitter 104 to scan the circular loop 504 twice. This double scanning of the circular loop advantageously tends to facilitate the detection of a return signal by the vehicle 100, as described in more detail later below.

In this embodiment, the communications conditions are such that an optical detector on board the further vehicle 300 does not receive sufficient power from the second light beam 500 to enable it to detect the second light beam 500. In other words, the second light beam 500 is attenuated by the water 302 to such a degree that, in effect, the second light beam 500 is not received by the further vehicle 300.

Because, in the second iteration i=2, the further vehicle 300 does not detect the light beam transmitted by the vehicle 100, the further vehicle 300 does not transmit a response optical signal towards the vehicle 100. Thus, in the second iteration of step s8, the processor 108 determines that no response optical signal is received at the optical signal detector 106, and a third iteration (i=3) of steps s4 to s8 is performed.

Figure 6:
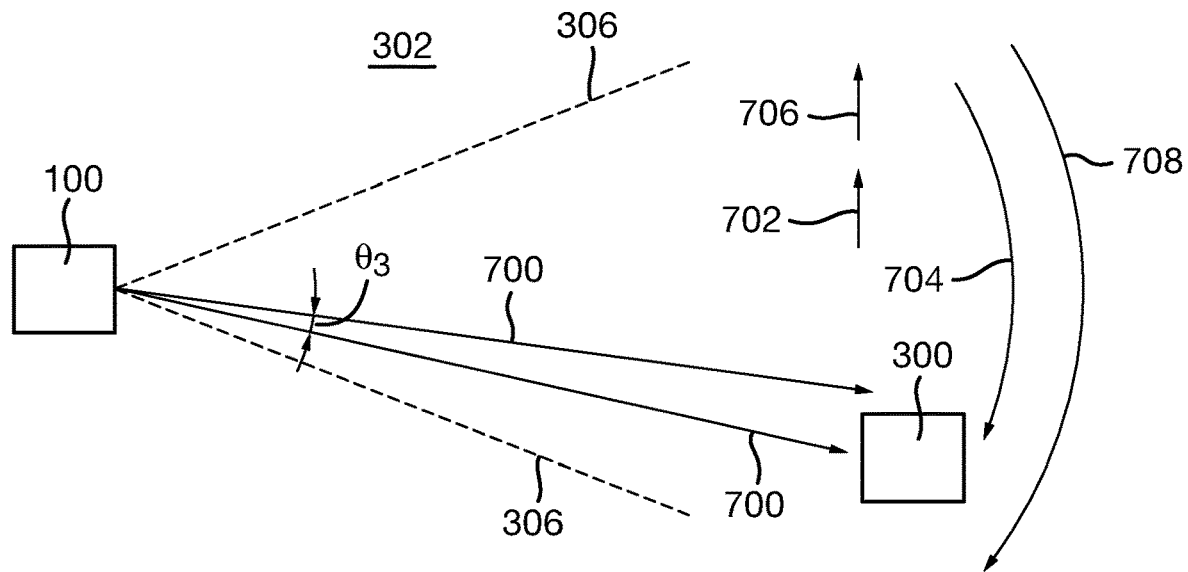
FIG. 6 is a schematic illustration (not to scale) showing transmission of a third light beam from the vehicle.

FIG. 6 is a schematic illustration (not to scale) showing transmission of the light beam at the (i=3) iteration of step s6.

In this embodiment, the vehicle 100 transmits the third light beam (bounded by solid arrows 700) in a direction of the further vehicle 300, through the optical medium 302. The third light beam 700 has a divergence of $\theta_3$, which, in this embodiment, is equal to $\theta_1/5$.

By decreasing the divergence of the beam (from $\theta_2$ to $\theta_3$), the effective range of the optical communication system 102 is increased.

In this embodiment, to cover the entirety of the search area 306, the third light beam 700 is scanned in a pattern indicated in FIG. 6 by arrows and the reference numerals 702-708, and described in more detail below with reference to FIG. 7.

Figure 7:
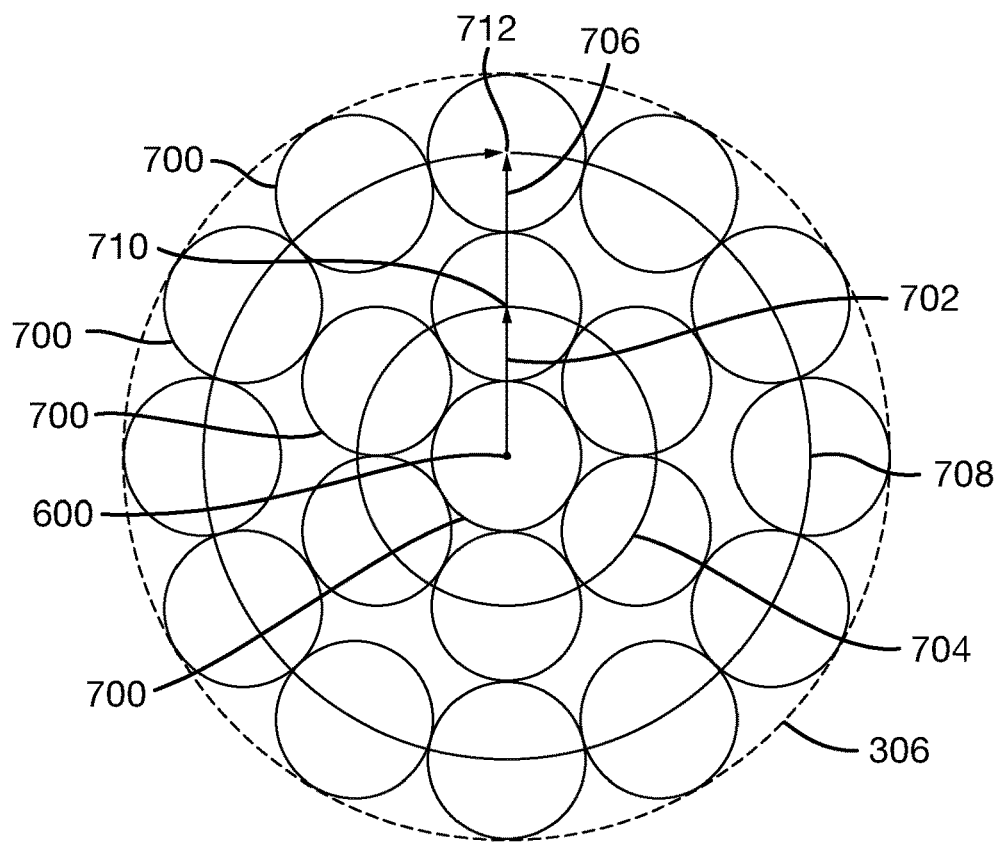
FIG. 7 is a schematic illustration (not to scale) showing a scan pattern used for the third light beam.

FIG. 7 is a schematic illustration (not to scale) showing a scan pattern implemented by the optical communications system 102 to scan the third light beam 700 over the search area 306. FIG. 7 shows the search area 306 from the point of view of the vehicle 100.

In this embodiment, the search area 306 is scanned as follows.

Firstly the processor 108 controls the optical signal transmitter 104 to transmit the third light beam 700 at the centre 600 of the search area 306. In particular, the optical signal transmitter 104 is centred with respect to the search area 306.

Secondly, after scanning at the centre 600 of the search area 306, the processor 108 controls the optical signal transmitter 104 to move its FoV towards the edge of the search area 306 through an angular distance of $\theta_1/5$ (i.e. the divergence of the light beam 500 in this iteration). This movement is indicated in FIG. 7 by a straight arrow and the reference numeral 702. The optical signal transmitter 104 is centred at point 710 shown in FIG. 7.

Thirdly, the processor 108 controls the optical signal transmitter 104 to scan an annular portion of the search area 306 by moving its FoV in a circular loop about the centre 600, maintaining the separation between the centre 600 and the transmitted light beam. This movement is indicated in FIG. 7 by an arrow and the reference numeral 704. Thus, an annulus surrounding the scanned central portion is scanned. Advantageously, this scanned circular loop 704 does not overlap with the originally scanned central portion. Thus, scanning of the search area 306 tends to be efficient in term of both time and power.

In this embodiment, the processor 108 controls the optical signal transmitter 104 to scan the circular loop 704 twice.

Next, after scanning the circular loop 704, the processor 108 controls the optical signal transmitter 104 to move its FoV towards the edge of the search area 306 through an angular distance of $\theta_1/5$ (i.e. the divergence of the light beam 500 in this iteration). This movement is indicated in FIG. 7 by a straight arrow and the reference numeral 706. The optical signal transmitter 104 is centred at point 712 shown in FIG. 7.

Lastly, the processor 108 controls the optical signal transmitter 104 to scan an outer annular portion of the search area 306 by moving its FoV in a circular loop about the centre 600, maintaining the separation between the centre 600 and the transmitted light beam. This movement is indicated in FIG. 7 by an arrow and the reference numeral 708. Thus, an annulus surrounding the scanned central portion and the circular loop 704 is scanned. Advantageously, this scanned circular loop 704 does not overlap with the originally scanned central portion or the scanned circular loop 704. Thus, scanning of the search area 306 tends to be efficient in term of both time and power.

In this embodiment, the processor 108 controls the optical signal transmitter 104 to scan the circular loop 708 twice.

More generally, the relationship between the iteration number and the number of concentric circular loops to be scanned is given by the following formula:

$$N = i-1, \text{ for } i=1,2,3,\ldots$$

where $N_i$ is number of concentric circular loops to be scanned at the ith iteration of steps s4 to s8. Thus, for example, at the second iteration, i=2, there is one loop 504 scanned about the central portion of the search area 306. Also, at the third iteration, i=3, there are two loops 704, 708 scanned about the central portion of the search area 306.

Also, the relationship between the iteration number and the radii of concentric circular loops to be scanned is given by the following formula:

$$r_i = \frac{k}{2i-1}\theta_1, \text{ for } k = 0, \ldots, i$$

where $r_i$ is the radius (i.e. a distance between the centre of the search area 306 and the centre of the FoV of the optical signal transmitter 104) of a loop at the ith iteration of steps s4 to s8. Thus, for example, at the second iteration, i=2, the radius of the loop 504 scanned about the centre 600 of the search area 306 is $\theta_1/3$. Also, at the third iteration, i=3, the radii of the two loops 704, 708 are $\theta_1/5$ and $2\theta_1/5$ respectively.

It should be noted that FIGS. 5 and 7 show the plane of the scan pattern and in order to create the scan pattern shown in the figures a pointing angle of the optical signal transmitter 104 is changed where the pointing angle defines the direction of the scan.

In this embodiment, the communications conditions and the increased irradiance of the third beam 700 are such that an optical detector on board the further vehicle 300 receives sufficient power from the third light beam 700 to enable it to detect the third light beam 700.

Figure 8:
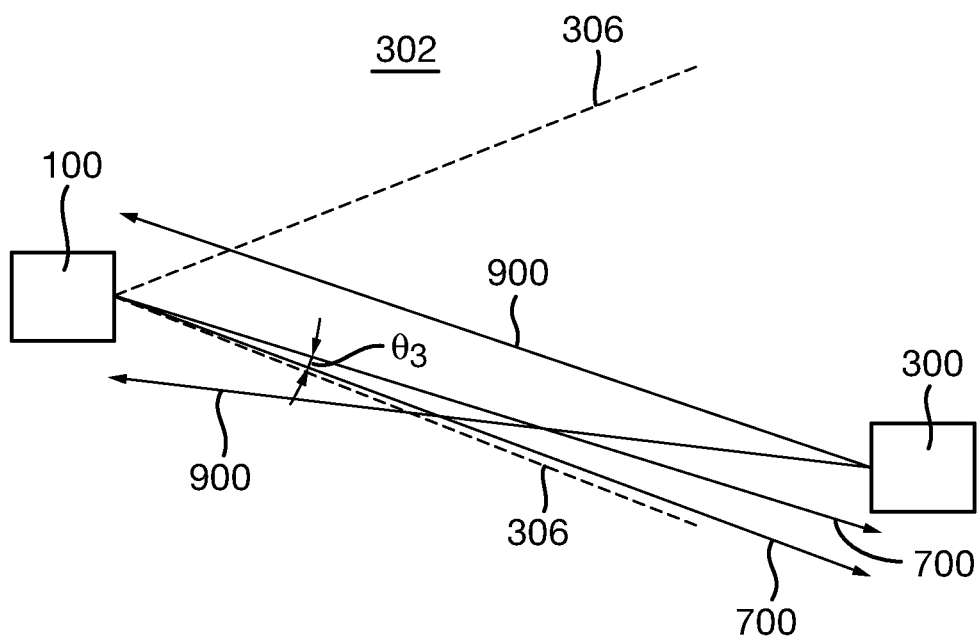
FIG. 8 is a schematic illustration (not to scale) showing a further vehicle transmitting a response light beam the vehicle in response to the further vehicle detecting the third light beam.

As shown in FIG. 8, in this embodiment, the further vehicle 300 detects the third light beam 700 transmitted by the vehicle 100. A processor of the further vehicle 300 then determines a location of the vehicle 100 using the measured third light beam 700. The further vehicle 300 then uses the determined location to transmit a response light beam 900 back towards the vehicle 100.

In this embodiment, when the third beam 700 from the vehicle 100 scans over the optical detector of the further vehicle 300 with sufficient irradiance, there is a finite time before the further vehicle 300 can direct a response light beam back towards the vehicle 100. By the time the further vehicle 300 does this, the vehicle 100 may have moved the third light beam 700 away from the further vehicle 300. Thus, the response light beam from the further vehicle 300 may be outside the FoV of the optical signal detector 106 of the vehicle 100. In this embodiment, as described above, at iterations i=2, 3, and so on, the search area 306 is scanned in a sequence of none overlapping concentric circular loops (e.g. loops 504, 704, 708). Each of these loops is repeated twice. Thus, advantageously, if the FoV of the optical signal detector 106 is moved away from the response light beam from the further vehicle 300 in the first performance of a scanning loop, the optical signal detector 106 is directed towards the response light beam from the further vehicle 300 in the second performance of that scanning loop.

Thus, the response optical signal tends to be received by the vehicle 100.

Thus, in the third iteration of step s8, the processor 108 determines that a response optical signal is received at the optical signal detector 106.

Returning now to the description of FIG. 2, in response to the processor 108 determining that a response optical signal is received at the optical signal detector 106 at some iteration of step s8, the method proceeds to step s12.

At step s12, the processor 108 stops the optical signal transmitter 104 scanning the search area 306.

At step s14, the processor 108 determines a location of the further vehicle 300 using the measured response light beam 900. The FSO communication system 100 may transmit a location signal in the form of an optical signal and/or an acoustic signal to enable the further vehicle 300 to identify the position of the FSO communication system and manoeuvre to a position where effective communication can take place. The location signal may act as a beacon and may undertake Identification Friend or Foe (IFF) so that the FSO communication system 100 may avoid an unknown acquisition or a known undesirable acquisition. The processor 108 then uses the determined location of the further vehicle 300 to transmit a communication optical signal to the further vehicle.

Figure 9:
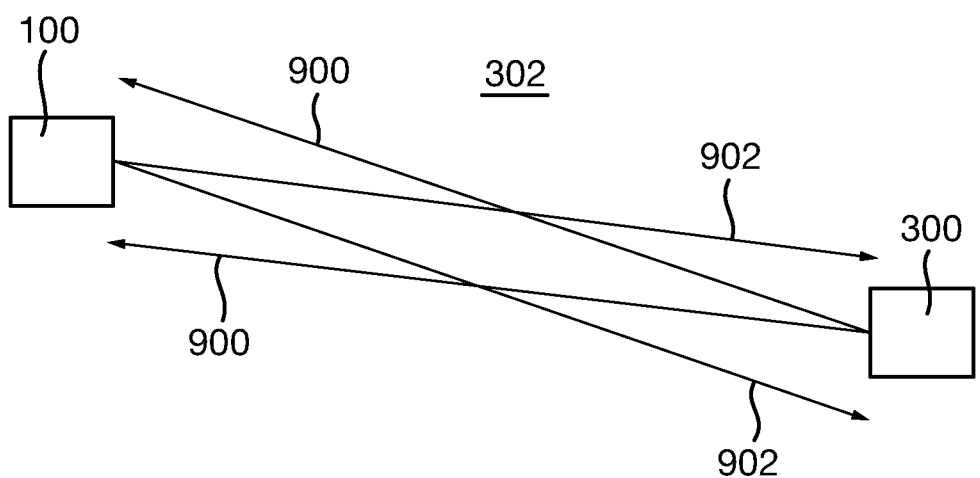
FIG. 9 is a schematic illustration (not to scale) showing two-way Free Space Optical communications between the vehicles and the further vehicle.

FIG. 9 is a schematic illustration (not to scale) showing the communication optical signals 900, 902 being transmitted between the vehicles 100, 300.

Thus, a two-way communication link between the two vehicles 100, 300 is provided.

In this embodiment, a tracking process is performed to actively align the light beams 900, 902 during data transfer between the vehicles 100, 300.

Thus, an optical communications process between submersible vehicles in an underwater environment is provided.

Advantageously, the above described method and apparatus allow one or more nodes of an optical communications system to efficiently and robustly acquire the location of one or more other nodes in a relatively short period of time.

The above described system and method tends to facilitate the acquisition of a datalink between two nodes.

The above described system and method is particularly useful in environments in which certain parameters (including, for example, range between nodes, turbidity of optical medium, locations of nodes, etc.) are unknown.

It should be noted that certain of the process steps depicted in the flowchart of FIG. 2 and described above may be omitted or such process steps may be performed in differing order to that presented above and shown in FIG. 2. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the optical communication system is implemented on board an unmanned submersible vehicle. Also, optical communications is performed between two submersible water vehicles. However, in other embodiments the optical communication system is implemented on a different entity, such as a building, a static underwater sensor node, or a different type of vehicle such as a manned submersible vehicle, a land-based vehicle, or an aircraft. In some embodiments, optical communications is performed between a different number of entities, such as more than two entities. Also, optical communications may be performed through more than one type of optical medium, such as through both air and water, e.g. if only one of the entities is underwater while the other is not underwater.

In the above embodiments, the optical signal transmitter and the optical signal detector are mechanically steerable. However, in other embodiments one or both of the transmitter and the detector is electronically steerable. In some embodiments one or both of the transmitter and the detector is not steerable relative to the vehicle. For example, in some embodiments, the optical signal transmitter and the optical signal detector are fixed relative to vehicle, and the vehicle is moved to vary the directions of the FoVs of the transmitter and the detector.

In the above embodiments, the light beam is not scanned during a first iteration of steps s4 to s8. However, in other embodiments, for example in embodiments in which the search area is larger than the maximum beam divergence, the first light beam is scanned over an area. In some embodiments, the first iteration of steps s4 to s8 may be, in effect, omitted, and the method may begin with iteration number 2, or higher.

In the above embodiments, the loops in which the optical signal transmitter is moved across when scanning the search area are substantially circular. Also, each loop is followed twice. However, in other embodiments, one or more of the loops is a different shape, i.e. not circular. Also, in some embodiments, one or more of the loops is scanned a different number of times, for example, once (e.g. if the vehicle is equipped with an AoA sensor having a wide FoV), or more than twice.

In the above embodiments, the divergence of a transmitted beam is varied for the purpose of establishing a communications link between the vehicle and the further vehicle. However, in other embodiment, the beam divergence may be varied for a different purpose, for example for data transfer after the communications link is established.

What will now be described is a further embodiment of an optical communications system that transmits wide divergence optical beams to establish or acquire a communications link with a different entity, and then transmits a narrow divergence beam for data transfer to and/or from that entity.

Figure 10:
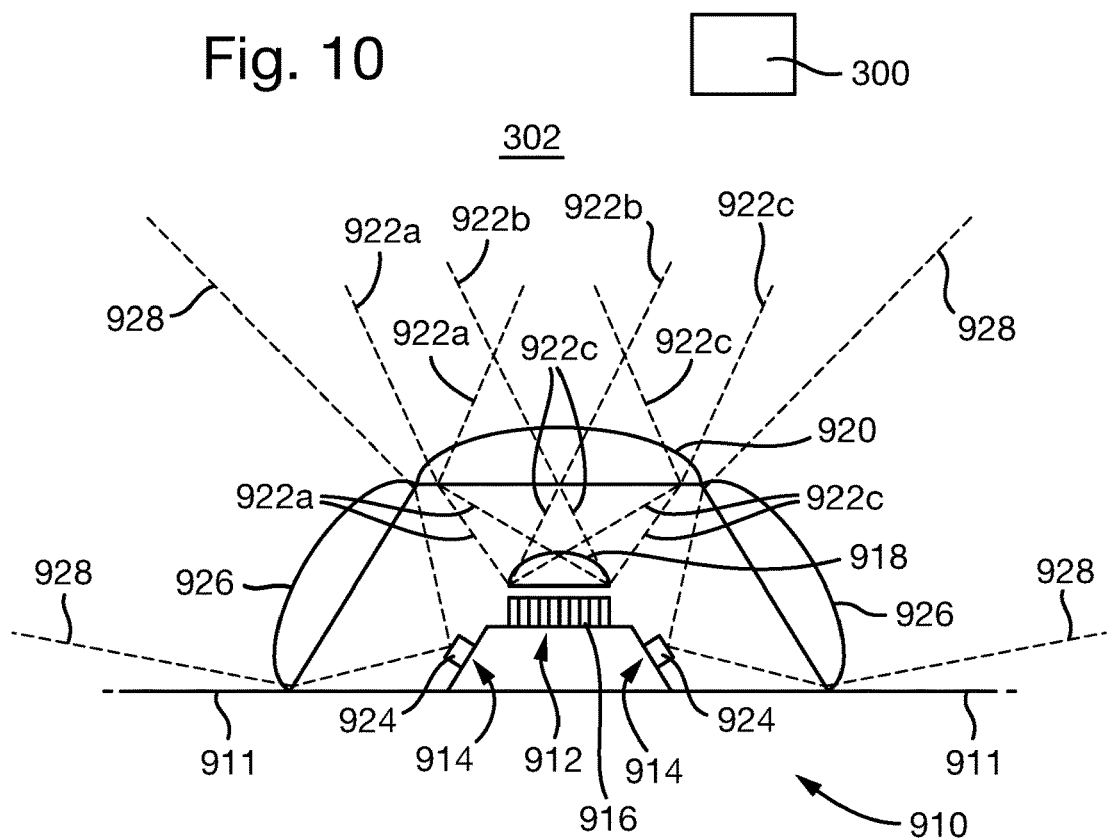
FIG. 10 is a schematic illustration (not to scale) showing a further optical communications system acquiring a communications link.

FIG. 10 is a schematic illustration (not to scale) showing an embodiment of an optical communications system 910.

In this embodiment, the optical communications system 910 is submersed in water 302, which may be sea water. The optical communications system 910 is fixed to a surface 911, which may be, for example, a sea bed.

The optical communications system 910 comprises three subsystems, namely a central subsystem 912, and two further subsystems 914 positioned at opposite sides of the central sub-system 912.

In this embodiment, the optical communications system 910 further comprises one or more optical detectors (not shown) for detecting incident optical signals. For example, transmit and receive modules may be combined into a single module, thereby providing a system of reduced size. For example, in some embodiments, a light source is located at the centre of one or more (e.g. each) optical detector elements. This light source may be, for example, an LED, Laser diode, VCSEL (Vertical Cavity Surface Emitting Laser), or an optical fibre coupled to a laser, an LED, or a VCSEL. In some embodiments, a light source is located between the optical detectors. This tends to reduce the impact of adding a light source to the detector element. However, in some embodiments, the optical communications system 910 does not include an optical detector, and may, for example, be used together with a separate receive module.

In this embodiment, the central subsystem 912 comprises an array of optical signal transmitters 916, a first lens 918, and a fluidic lens 920. The array of optical signal transmitters 916 comprises a plurality of optical transmitters which may be controlled, e.g. by a controller (not shown) coupled to the array 916, to electronically steer a light beam transmitted by the array 916. Three examples of steered light beams transmitted by the array 916 are shown in FIG. 10 as bounded by respective pairs of dotted lines and indicated by the reference numerals 922a, 922b and 922c respectively. In this embodiment, the array of optical transmitters 916 is arranged to transmit optical signals 922a-c to the first lens 918. The first lens 918 focusses the optical signals 922a-c onto the fluidic lens 920, from which the optical signals 922a-c are emitted into the water 302.

In this embodiment, each of the further subsystems 914 comprises a respective optical signal transmitter 924 and a respective lens 926. For each further subsystem 914, the optical transmitter 924 of that subsystem 914 is arranged to transmit respective optical signals 928 to the lens 926 of that subsystem 914, from which those optical signals 928 are emitted into the water 302.

In other embodiments, the optical communications system 910 comprises a different number of subsystems, e.g. more than three. For example, in some embodiments, the optical communications system comprises a central subsystem and a plurality (e.g. 6) further subsystems arranged around the periphery of the central subsystem, each further subsystem facing in a different respective direction. In some embodiments, multiple subsystems comprise fluidic lenses.

The optical communications system 910 is shown in FIG. 10 performing a process of acquiring a communications link with the further vehicle 300. During performance of this process of acquiring a communications link, the fluidic lens 920 is controlled such that the divergence of the transmitted beam 922a-c is relatively large (e.g. greater than or equal to 50°, e.g. 50° to 60°). For example, the fluidic lens 920 may be controlled such that the beam divergence of an optical signal 922a-c transmitted by the central sub-system 912 is a maximum achievable beam divergence.

Also, the lenses 926 are configured such that the divergences of the light beams 928 transmitted by the further subsystems 914 are relatively large (e.g. greater than or equal to 50°, e.g. 50° to 60°).

During the process of acquiring a communications link, the transmitted light beams 922a-c 928 may be, for example, continuous wave (CW) beams, alternating current (AC) modulated beams, low data rate optical signals for performing an Identification Friend or Foe (IFF) process, or a combination thereof.

In this embodiment each of the subsystems 912, 914 has a respective different facing. In other words, the central sub-system 912 and each of the further sub-systems 914 is configured to transmit optical signals into the water 302 in a different direction.

Advantageously, transmission of wide divergence light beams in a plurality of different directions by the optical communications system 910 tends to increase the likelihood that the further vehicle 300 receives an optical signal.

After receiving a wide divergence light beam transmitted by the optical communications system 910, the further vehicle 300 transmits a response optical signal to the optical communications system 910. The optical communications system 910 receives the response optical signal from the further vehicle 300 and performs tracking and communication, for example, as described in more detail earlier above with reference to step s14.

Figure 11:
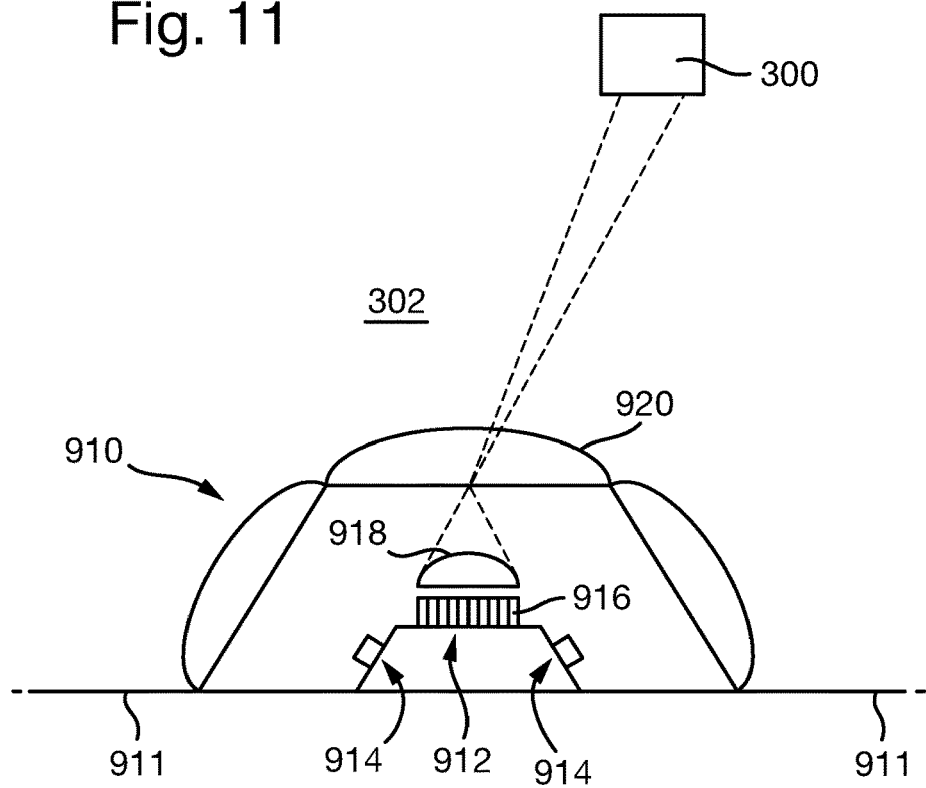
FIG. 11 is a schematic illustration (not to scale) showing the further optical communications system performing tracking and communication processes.

FIG. 11 is a schematic illustration (not to scale) showing the optical communications system 910 tracking and communicating with the further vehicle 300.

In this embodiment, the optical communications system 910 determines the relative location of the further vehicle 300 using the response optical signal received from the further vehicle. The array 916 is then controlled (e.g. by the controller) to transmit a further optical signal 930 to the further vehicle 300. In this embodiment, the further optical signal 930 encodes data that is being transferred (for example, at a higher rate compared to the transfer of any data occurring during the communication acquisition process shown in FIG. 10) between the optical communications system 910 and the further vehicle 300. The further optical signal 930 has a higher signal level than the optical signals 922a-c, 928 transmitted during the communication acquisition process shown in FIG. 10.

In this embodiment, the array 916 is controlled (e.g. by the controller) so that the further optical signal 930 is electronically steered towards the further vehicle 300.

Also, the fluidic lens 920 is controlled (e.g. by the controller) so that the further optical signal 930 has a relatively narrow beam divergence compared to the divergences of the beam 922a-c, 928 transmitted during the communication acquisition process shown in FIG. 10. The further optical signal 930 may also have increased irradiance compared to the irradiances of the beam 922a-c, 928 transmitted during the communication acquisition process. In some embodiments, the beam divergence and/or the irradiance of the further optical signal 930 is determined (e.g. optimised) based on a determination of a distance between the optical communications system 910 and the further vehicle 300.

Thus, a further embodiment of an optical communications system is provided.

Advantageously, a smart transmit system which uses electronic beam steering for acquisition, tracking and data transfer is provided. Wide divergence beams are transmitted during the acquisition phase (with optional IFF), which are then switched to a narrower beams for the main transfer of information. This advantageously tends to reduce the power used to transmit at a set data rate. Also, data transfer tends to be more covert.

In some embodiments, the optical communications system 910 comprises a mechanical beam steering module, for example a pan/tilt unit, instead of or in addition to the electronic beam steering means.

In some embodiments, the optical communications system 910 comprises a different type of means for varying the divergence of a transmitted light beam instead of or in addition to the fluidic lens. For example, the optical communications system 910 may comprise a translating lens, a zoom lens, a programmable liquid crystal lens, or a programmable holographic lens (such as a switchable Bragg Element or a Digilens).

In the above embodiments, the optical communications system comprises means for varying beam divergence. However, in other embodiments, the optical transmitter is not configured for selectively varying the divergence of a beam. For example, in some embodiments, the optical communications system comprises a plurality of optical signal transmitters, each of which is configured to produce a beam having a different divergence and irradiance.

In the above embodiments, the vehicle illuminates the search area with beams having successively decreasing beam divergence, and hence successively increasing irradiance. However, in other embodiments, the vehicle illuminates the search area in a different way.

The invention claimed is:

1. A method of transmitting an optical signal by a Free Space Optical (FSO) communication system, the method comprising:
   transmitting, by an optical signal transmitter, an optical signal towards a source present within a volume of water, the optical signal having a first beam divergence such that the optical signal covers a given search area in the volume of water;
   in response to not receiving an incident optical signal from the source after transmitting the optical signal, reducing the first beam divergence of the optical signal to a second beam divergence; and
   controlling, by a controller, the optical signal transmitter, to scan at least part of the given search area using the optical signal having the second beam divergence in a sequence of non-overlapping closed loops.

2. The method according to claim 1, wherein the sequence of non-overlapping closed loops is a sequence of non-overlapping, concentric closed loops.

3. The method according to claim 1, wherein controlling the optical signal transmitter comprises controlling the optical signal transmitter to scan the at least part of the given search area by repeating at least part of one or more of the loops at least twice.

4. The method according to claim 1, wherein transmitting the optical signal comprises:
   generating an optical signal;
   modifying a divergence and an irradiance of the generated optical signal such that at least one of the divergence and the irradiance is equal to a preselected value; and
   transmitting the modified optical signal.

5. The method according to claim 1, the method further comprising:
   transmitting, by the optical signal transmitter or a further optical signal transmitter, a further optical signal into the at least part of the given search area, the further optical signal having a different beam divergence than either the first or second beam divergence; and
   controlling, by a controller, the optical signal transmitter or the further optical signal transmitter, to scan the at least part of the given search area using the further optical signal in a further sequence of non-overlapping closed loops.

6. The method according to claim 1, the method further comprising:
   transmitting, by the optical signal transmitter or a further optical signal transmitter, a further optical signal into the at least part of the given search area, the further optical signal having a decreased beam divergence than the second beam divergence; and
   controlling, by the controller, the optical signal transmitter or the further optical signal transmitter, to scan the at least part of the given search area using the further optical signal in a further sequence of non-overlapping closed loops.

7. The method according to claim 1, the method further comprising:
   responsive to transmitting the optical signal having the second beam divergence into the at least part of the given search area, receiving, by an optical signal detector, an incident optical signal; and
   determining, based on measurements of the incident optical signal by the optical signal detector, a location of a source of the incident optical signal.

8. The method according to claim 7, wherein a field of view of the optical signal transmitter is directed in a same direction as a field of view of the optical signal detector.

9. The method according to claim 8 wherein the FSO communication system transmits a location signal wherein the location signal at least operates to enable the source of the incident optical signal to identify the position of the FSO communication system.

10. The method according to claim 9 wherein the location signal is transmitted in substantially the same direction as the field of view of the optical signal detector.

11. A Free Space Optical (FSO) communication system comprising:
   an optical signal transmitter configured to transmit an optical signal towards a source present within a volume of an optical medium, the optical signal having a first beam divergence such that the optical signal covers a given search area in the volume of the optical medium; and
   a controller configured to
      in response to not receiving an incident optical signal from the source after transmitting the optical signal, reduce the first beam divergence of the optical signal to a second beam divergence, and control the optical signal transmitter to scan at least part of the given search area using the optical signal having the second beam divergence in a sequence of non-overlapping closed loops.

12. The FSO communication system according to claim 11, wherein:

the sequence of non-overlapping closed loops is a sequence of non-overlapping, concentric closed loops; and the controller is further configured to scan the at least part of the given search area by repeating at least part of one or more of the loops at least twice.

13. The FSO communication system according to claim 11, further comprising:

an optical signal detector configured to, responsive to the optical signal transmitter transmitting the optical signal having the second beam divergence into the at least part of the given search area, receive an incident optical signal; and one or more processors configured to determine, using measurements of the incident optical signal by the optical signal detector, a location of a source of the incident optical signal;

wherein a field of view of the optical signal transmitter is directed in a same direction as a field of view of the optical signal detector.

14. A vehicle comprising the FSO communication system according to claim 11, wherein the vehicle is a submersible vehicle.

15. A Free Space Optical (FSO) communication system comprising:

an optical signal transmitter configured to transmit an optical signal into at least part of a volume of an optical medium, the optical signal having a first beam divergence such that the optical signal covers a given search area in the volume of the optical medium;

an optical signal detector configured to receive an incident optical signal associated with the transmitted optical signal; and one or more processors configured to in response to not receiving the incident optical signal after transmitting the optical signal, reducing the first beam divergence of the optical signal to a second beam divergence, and control the optical signal transmitter to scan at least part of the given search area using the optical signal having the second beam divergence in a sequence of non-overlapping closed loops, and wherein one or more of the one or more processors are configured to determine a location of a source of an incident optical signal received after transmitting the optical signal having the second beam divergence, based on measurements of the response incident optical signal by the optical signal detector.

16. The FSO communication system according to claim 15, wherein:

the sequence of non-overlapping closed loops is a sequence of non-overlapping, concentric closed loops; and the controller is further configured to scan the at least part of the given search area by repeating at least part of one or more of the loops at least twice.

17. The FSO communication system according to claim 15, wherein a field of view of the optical signal transmitter is directed in a same direction as a field of view of the optical signal detector.

18. A vehicle comprising the FSO communication system according to claim 15, wherein the vehicle is a submersible vehicle.

19. The FSO communication system according to claim 11, wherein the optical medium is water.

20. The FSO communication system according to claim 15, wherein the optical medium is water.

* * * * *